Jan. 11, 1966  A. J. O. JÖRGENSEN  3,228,480
ADJUSTING DEVICE FOR ADJUSTING THE PITCH OF PROPELLER BLADES
Filed Nov. 9, 1962  3 Sheets-Sheet 1
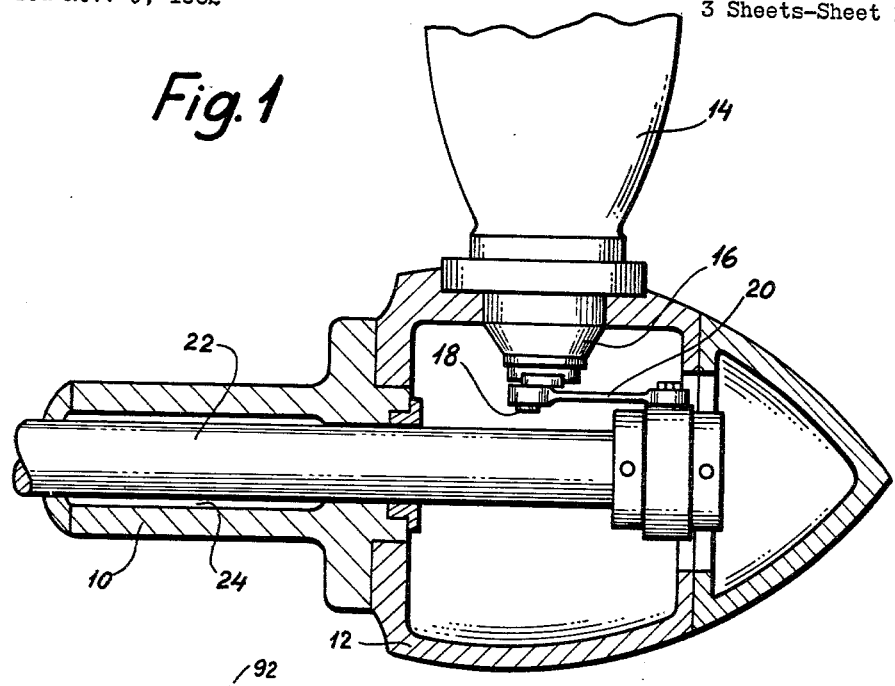
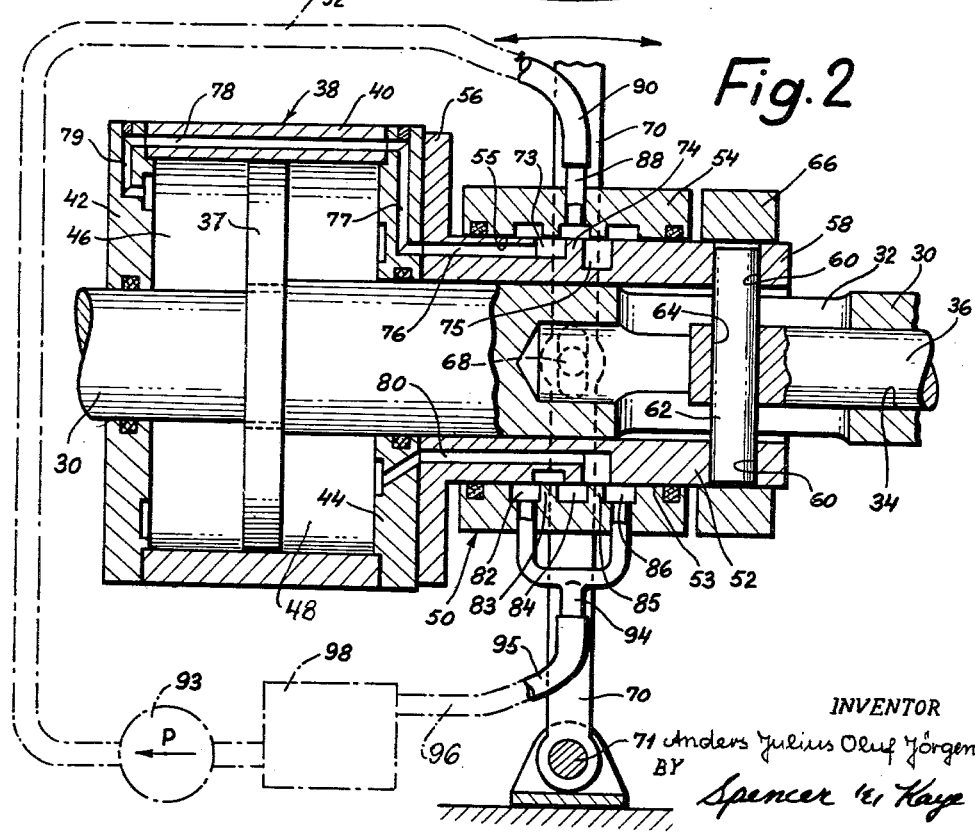
INVENTOR
Anders Julius Oluf Jörgensen
BY
Spencer & Kaye
ATTORNEYS Jan. 11, 1966  A. J. O. JÖRGENSEN  3,228,480
ADJUSTING DEVICE FOR ADJUSTING THE PITCH OF PROPELLER BLADES
Filed Nov. 9, 1962  3 Sheets-Sheet 2
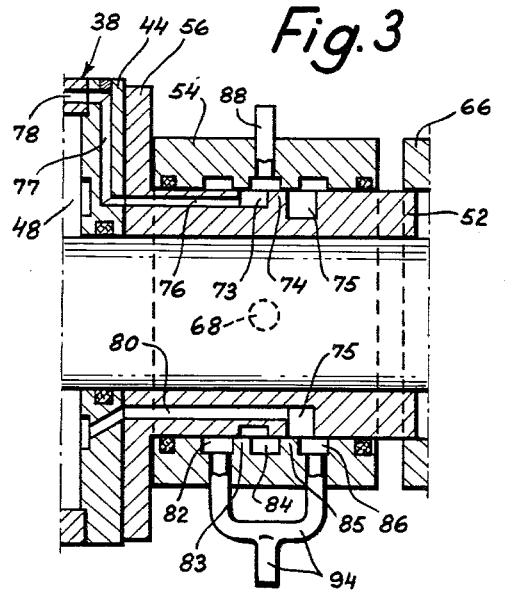
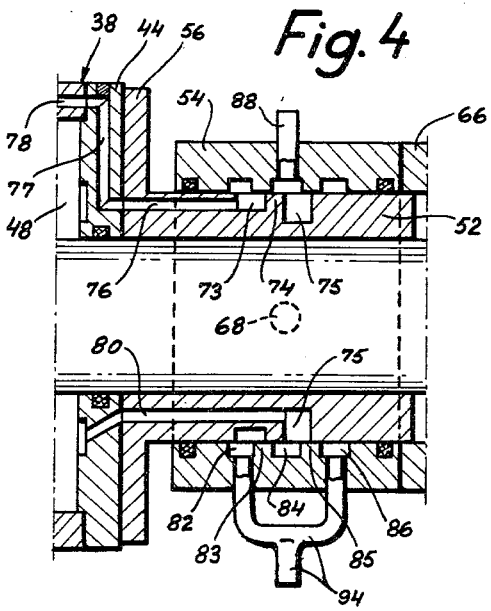
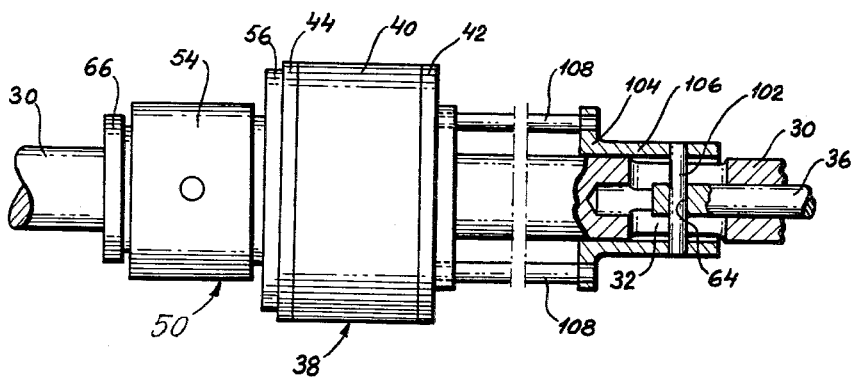
INVENTOR
Anders Julius Oluf Jörgensen
BY
Spencer & Kaye
ATTORNEYS Jan. 11, 1966    A. J. O. JÖRGENSEN    3,228,480
ADJUSTING DEVICE FOR ADJUSTING THE PITCH OF PROPELLER BLADES
Filed Nov. 9, 1962    3 Sheets-Sheet 3
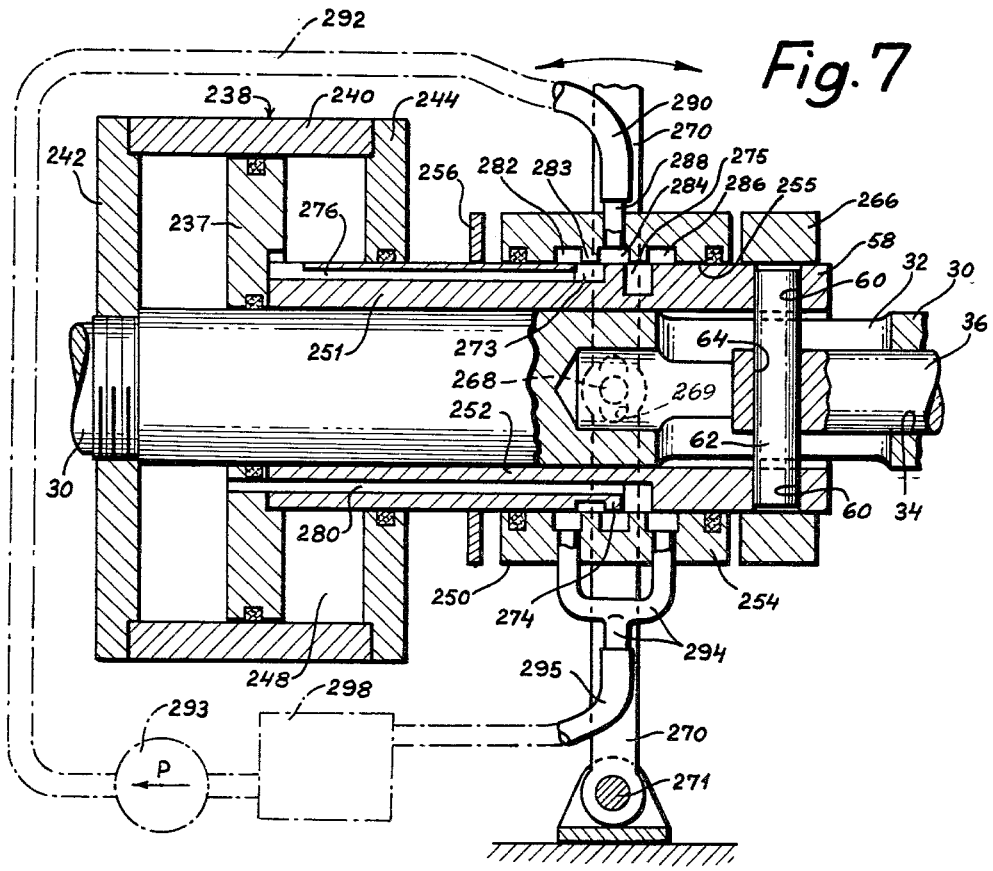
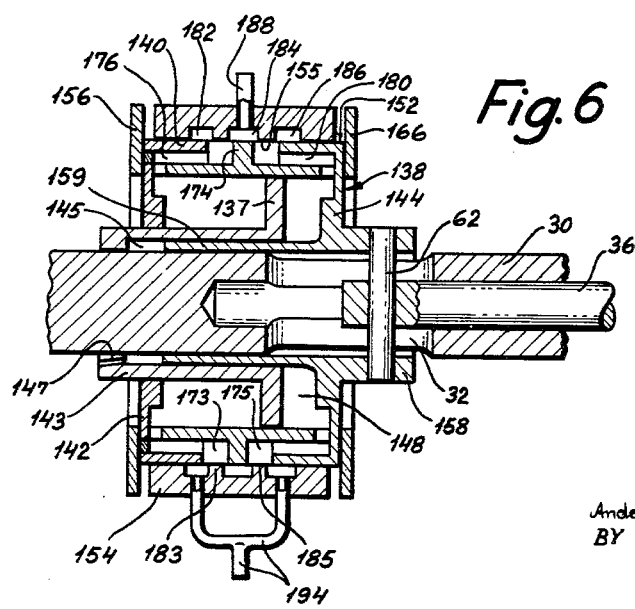
INVENTOR:
Anders Julius Oluf Jörgensen
BY Spencer & Kaye
ATTORNEYS

United States Patent Office 3,228,480
Patented Jan. 11, 1966

1

3,228,480
ADJUSTING DEVICE FOR ADJUSTING THE
PITCH OF PROPELLER BLADES
Anders Julius Oluf Jörgensen, Hundested, Denmark, assignor to Hundested Motorfabrik Aktieselskab, Hundested, Denmark
Filed Nov. 9, 1962, Ser. No. 236,628
Claims priority, application Denmark, Nov. 9, 1961, 4,462/61
12 Claims. (Cl. 170—160.32)

The present invention relates to an adjusting device for adjusting the pitch, including reversing, of propeller blades by axial displacement of an adjusting rod slidably mounted within a hollow propeller shaft.

More particularly, the present invention relates to such an adjusting device in which a clutch member is arranged slidable or axially displaceable on the propeller shaft for rotating therewith and adapted to be firmly connected to said adjusting rod so that the axial displacements of said rod for adjusting the angular pitch of the propeller blades may be provided by an axial displacement of said clutch member, and in which said axial displacement of the clutch member is performed by means of an hydraulic servo-motor comprising a servo-cylinder surrounding the propeller shaft, and an annular servo-piston arranged within the servo-cylinder and also surrounding the propeller shaft, of which two said servo-motor main parts the one is axially displaceable relative to the propeller shaft, the other is axially undisplaceable relative to said shaft.

Prior to the present invention in such adjusting devices the servo-cylinder has been stationary so that the servo-piston had to rotate either relative to the propeller shaft or relative to the servo-cylinder whereby complications appeared. It is also known to use a servo-piston composed by an inner ring slidably mounted on the propeller shaft for rotating therewith and an outer ring rotatably mounted on the inner ring. Such a piston is, however, rather complicated.

It is an object of the present invention to provide an adjusting device of the type stated which is rather simple.

Another object of the invention is to provide an adjusting device of the type stated by which apart from a valve member and a control member for adjusting said valve member all other members thereof are arranged to rotate with the propeller shaft whereby the connecting means between last said members can be made very simple.

Still another object of the invention is to provide an adjusting device of the type stated which is not only very simple but by which further all the members thereof are easily accessible from the outer side of the adjusting device.

A further object of the invention is to provide an adjusting device for adjusting the pitch of adjustable propeller blades by axial displacement of an adjusting rod slidably mounted within a hollow propeller shaft, which device comprises a clutch member mounted axialy displaceable on the propeller shaft for rotating therewith and is adapted to be firmly connected to the said adjusting rod, an hydraulic servo-motor for controlled displacement of said clutch member, which servo-motor comprises a servo-cylinder surrounding the propeller shaft and arranged to rotate therewith and an annular servo-piston arranged within said servo-cylinder surrounding the propeller shaft and also arranged to rotate therewith, of which said two

2 servo-motor main parts the one is secured to said propeller shaft and the other is axially displaceable mounted on said propeller shaft and firmly connected to said clutch member, whereby a slide valve device serves for controlling the inlet and outlet of motive fluid to and from said servo-motor, which slide valve device comprises a tubular valve spool surrounding said propeller shaft and arranged to rotate therewith, which valve spool is further firmly connected to the axially displaceable main part of the servo-motor, and a valve housing slidably and rotatably mounted on said valve spool surrounding the same and connected to means, by which it is prevented in rotating with the valve spool and thereby with the propeller shaft, and to a control member by means of which it can be axially displaced relative to said valve spool for controlling the direction of motive fluid to and from the two cylinder chambers of the servo-cylinder.

Other objects and the nature and advantages of the intant invention will be apparent from the following description taken in conjunction with the accompanying drawings, wherein:

FIG. 1 is a diagrammatic illustration of a longitudinal sectional view of a marine propeller having adjustable blades, FIG. 2 is a diagrammatic view in longitudinal section of an adjusting device embodying my invention, in which a valve housing is shown in its neutral position relative to a valve spool, FIG. 3 is a portion of the longitudinal section shown in FIG. 2, showing the valve housing in its one extreme position relative to the valve spool, FIG. 4 is a view corresponding to FIG. 3, but showing the valve housing in its other extreme position relative to the valve spool, FIG. 5 is on a minor scale a side view of an adjusting device corresponding to the one shown in FIG. 2, but with another embodiment of the clutch member, FIG. 6 is a diagrammatic view in longitudinal section of a second embodiment of my invention, and FIG. 7 is a diagrammatic view in longitudinal section of a third embodiment of my invention.

In FIG. 1, 10 represents a hollow propeller shaft to the extreme end of which a propeller hub 12 is secured. The hub 12 carries three propeller blades 14 of which only one is shown in the drawing. Each blade 14 is provided with a hub 16 rotatably mounted in the hub 12. At its inner end the hub 16 is provided with an excentrically arranged pin 18. The pins 18 of the three blades are by means of connecting links 20, of which only one is shown in the drawing, connected to an adjusting rod 22 slidably arranged in the bore 24 of the hollow propeller shaft 10. By axial displacement of the adjusting rod 22 in the propeller shaft 10 by means of the connecting links 20 each blade 14 may be rotated between two extreme positions, the one corresponding to "full speed ahead," the other to "full speed astern" and further the blades may be brought to assume any position between said two extreme positions.

The propeller device shown in FIG. 1 serves only for the explanation of the purpose of the adjusting device according to the present invention, but does not constitute any part thereof, and my new adjusting device may be used together with any type of propellers, especially marine propellers, provided with adjustable blades and by which the blades may be adjusted by an axial displacement of an adjusting rod corresponding to the rod 22 and slidably mounted within a hollow propeller shaft corresponding to the shaft 10.

A first embodiment of my adjusting device is illustrated in FIGS. 2 to 4. 30 represents a propeller shaft corresponding to the propeller shaft 10 in FIG. 1. The propeller shaft 30 is provided with a transverse slot 32, and the part of the propeller shaft 30 extending from the slot 32 to the propeller hub is provided with a central bore 34 in which an adjusting rod 36 corresponding to the adjusting rod 22 in FIG. 1 is slidably arranged with its free end extending into the slot 32.

On the solid part of the shaft 30 a servo-piston 37 is secured. The piston is arranged within a servo-cylinder 38 comprising a cylinder wall 40 and two end covers 42 and 44. The servo-cylinder 38 is tightly fitting, but axially displaceable mounted on the shaft 30 and defines cylinder chambers 46 and 48 on each side of the piston 37.

50 represents a slide-valve device comprising a tubular valve spool 52 and a valve housing 54. The valve spool 52 is slidably mounted on the shaft 30 and is at its end facing the end cover 44 provided with a flange 56 secured to the end cover 44. At its opposite end the spool 52 has an extension 58 serving as a clutch member. The clutch member 58 is provided with two radial holes 60 diametrally opposite each other in which holes there is inserted a clutch pin 62 extending through the transverse slot 32 and a hole 64 in the free end of the adjusting rod 36. The pin 62 has a diameter corresponding to the width of the slot 32 and ensure thereby that the clutch member 58, the spool 52 and the cylinder 38 rotate with the shaft 30. A stop ring 66 is secured to the clutch member 58 surrounding the same and covering the holes 60 so that the clutch pin 64 is secured in the clutch member 58.

The stop ring 66 and the flange 56 serve as stop members for the valve housing 54 which surrounds the valve spool 52 and with a cylindrical inner face 55 is slidably or axially displaceable mounted on the cylindrical outer face 53 of the valve spool 52.

On its outer side the valve housing 54 is provided with a pin 68 engaging a control lever 70 pivoted to a stationary pin 71 beneath the housing 54.

The valve spool 52 is on its outer face 53 provided with two equally wide circumferential grooves 73 and 75 separated from each other by means of a land 74 having a width slightly smaller than the width of the grooves 73 and 75. The groove 73, located nearest the flange 56, communicates with the cylinder chamber 46 through at least one, preferably, according to the size of the device, several set of passageways, each comprising an axial bore 76 in the valve spool 52, a radial bore 77 in the end cover 44, an axial bore 78 in the cylinder-wall 40, and a radial bore 79 in the end cover 42. The other groove 75 which is deeper than the groove 73 communicates with the cylinder chamber 48 at the end cover 44 through one or more inside the groove 73 arranged axial bores 80 in the valve spool 52.

The valve housing 54 is on its inner face 55 provided with three annular grooves 82, 84 and 86 each having a width corresponding to the width of the grooves 73 and 75 in the valve spool 52 and being separated from each other by means of lands 83 and 85, the width of which corresponds to the width of the land 74 in the valve spool 52. The middle groove 84 in the valve housing 54 communicates with a pipe socket 88 on the housing, which pipe socket may by means of a flexible hose 90 communicate with an inlet line 92 through which motive fluid under pressure is by means of a pump 93 directed to the groove 84. The two side grooves 82 and 86 in the valve casing communicate with a branch pipe 94 on the same, which branch pipe communicates through a flexible hose 95 with a fluid discharge line 96 through which motive fluid from the side grooves 82 and 86 is directed to a reservoir 98 communicating with the pump 93.

In FIG. 2 the valve housing 54 is shown in its neutral position on the valve spool 52, in which position there is a space between the housing 54 and the flange 56 as well as between the housing 54 and the stop ring 66. In said neutral position the middle groove 84 of the valve housing 54 is located opposite the land 74 of the valve spool 52. As this land 74 is slightly narrower than the groove 84 the latter will communicate with both the grooves 73 and 75 in the valve spool 52 and thus also with both the cylinder chambers 46 and 48. The same is also the case with regard to the side grooves 82 and 86 of the valve housing 54, which grooves are partially displaced in over the grooves 73 and 75 in the valve spool 52 so that between these grooves 73 and 75 and the grooves 82 and 86 in the housing 54 open slots appear along the sides of the lands 83 and 85 in the housing. Thus in the neutral position of the valve housing 54 the motive fluid can flow free through the slide valve device 50, and, consequently, the servo-cylinder 40 will remain in the arbitrary position relative to the piston 37 it might assume at the time when the slide-valve device 50 was set in neutral position.

If now by means of the control lever 70 the valve housing 54 is displaced from its neutral position to the extreme position on the valve spool 52 shown in FIG. 3, in which it abuts the flange 56 its middle groove 84 will be located partly opposite the groove 73 in the valve spool 52, the side groove 82 of the casing 54 will be shut off from the groove 73, and the side groove 86 will be located partly opposite the groove 75 of the valve spool 52. The motive fluid from the pump 93 will then be directed through the pipe 88, the grooves 84 and 73, and the passageways 76, 77, 78 and 79 into the cylinder chamber 46 nearest the end cover 42, while the fluid located in the chamber 48 at the opposite end of the servo-cylinder 38 through the passageway 80 flows into the grooves 75 and 86 and back to the reservoir 98 through the branch pipe 94. The servo-cylinder 38 will now influenced by the motive fluid be displaced to the left in FIG. 2 carrying along the valve spool 52 and the clutch member 58 as well as the adjusting rod 11 for rotation of the propeller blades.

This displacement of the servo-cylinder 38 will continue as long as by means of the control lever 70 the valve housing 54 is manually brought to follow the displacement of the servo-cylinder 38 and to abut the flange 56. When the control lever 70 together with the valve housing 54 have reached the position corresponding to the wanted new position of the propeller blades, which position may for example be read on an indicating device (not shown), the control lever is manually retained in said position, and during the further displacement of the servo-cylinder 38, the valve spool 52 will be displaced relative to the valve housing 54 until it assumes its neutral position relative to the valve housing shown in FIG. 1. At this position the cylinder chambers 46 and 48 on both sides of the servo-piston 37 will communicate freely with the inlet line 92 as well as with the discharge line 95 for the motive fluid so that the displacement of the servo-cylinder 38 is stopped.

If then the valve housing 54 is displaced to abutment with the stop ring 66 as shown in FIG. 4, its middle groove 84 will be located partly above the valve spool groove 75, and thus through this groove direct the motive fluid into the cylinder chamber 48 nearest the end cover 44 for displacement of the cylinder to the right in FIG. 2 carrying along the valve spool 52, the clutch member 58, and the adjusting rod 36 for a return movement of the blades. The motive fluid located in the opposite cylinder chamber 46 is through the valve spool groove 73, the groove 82 of the valve housing 54, and the branch pipe 94 discharged to the reservoir 98. Also this displacement of the servo-cylinder 38 is stopped in the manner described above by preventing the valve housing 54 in following the servo-cylinder 38 and the valve spool 52 so that again the valve housing 54 assumes its neutral position relating to the valve spool 52.

In all the positions the servo-cylinder 38 may be caused to assume on the propeller shaft 30, displacement influences, if any, from the propeller blades through the adjusting rod 36, the clutch member 58, and the valve spool 52 on the servo-cylinder 78, will only cause a slight displacement of the latter in one direction or the other, since the valve spool 52 will by such a displacement immediately be moved away from its neutral position relative to the valve housing which is retained by the control lever 70, and motive fluid will be displaced into one chamber or the other of the servo-cylinder 38 and displaced the cylinder 38 opposite to the displacement received until the valve spool 52 again assumes its neutral position relative to the valve housing 54.

The length of the displacement of the cylinder 38 thus caused by the propeller blades will subtsantially be determined by the difference between the width of the valve housing middle groove 84 and the valve spool land 74 between the grooves 73 and 75, and, consequently, it will always be possoble to secure that said displacements are very small and without influence on the position of the servo-cylinder 38 and the propeller blades obtained by the setting of the valve housing 54. The servo-cylinder 38 will consequently automatically remain in the given position until for operation of the propeller blades by means of the control lever 16 the valve housing 54 is again displaced away from its neutral position relative to the valve spool 52. The control lever 70 can be connected to one or more operating members (not shown) on preferred places in the vessel where also the corresponding indicator or indicators can be arranged.

It has to be observed that by a suitable dimensioning of the width of the grooves 73, 75, 82, 84 and 86 together with a sufficient large distance between the two stop members 56 and 66 it is possible to arrange the control in such a manner that by means of the control lever 70 the valve housing 54 may at once be displaced to its position corresponding to the wanted new position of the propeller blades so that the valve housing 54 does not necessarily have to follow the displacement of the servo-cylinder 38 as is the case by the embodiment described. Such an embodiment will, however, besides the indicating device connected to the control lever 70 demand a further indicating device connected to the valve spool 52 and by which the actual position of the valve spool 52 can always be read. Otherwise it cannot be ensured that the position wanted of the propeller blades is obtained. This is ensured, however, by the embodiment described, while by this embodiment the control lever 70 and the indicator connected thereto are forced to follow the servo-cylinder 38 and thereby the valve spool 52, until the valve housing 54 has assumed its position corresponding to the wanted new position of the propeller blades. Thereafter the servo-cylinder is displaced only a very short distance, and, consequently, it is almost certain that the propeller blade position corresponds to the position set.

Although by an adjusting device according to the invention it is necessary that the clutch member and the valve spool are firmly connected to each other so that the valve spool is positively forced to follow the axial displacements of the clutch member, it is not necessary that the clutch member is direct connected to the valve spool as is the case in the embodiment described above.

Thus, in FIG. 5 an embodiment is shown by which the servo-motor device, consisting of the slide valve device 50, the servo-cylinder 38, and the servo-piston 37, is arranged on the propeller shaft 30 in such a manner that the slide valve device 50, and the inner end of the adjusting rod 36 are positioned at either side of the servo-cylinder 38. Otherwise the servo-motor device 37, 38, 50 is unchanged the same as the corresponding servo-motor device shown in FIGS. 2 to 4. By the embodiment shown in FIG. 5, however, the clutch member is made as a sleeve 106 mounted axially displaceable on the propeller shaft 30 covering the shaft slot 32 for the transverse clutch-pin 102, which is secured to the sleeve 106. The sleeve 106 is provided at the end thereof facing the servo-cylinder end cover 42 with a side flange 104 which is firmly connected to the end cover 42 by means of bolts or connecting rods 108. However, as the servo-cylinder 38 as a whole is firmly connected to the valve spool 52 also by this embodiment the clutch member 106 is firmly connected to the valve spool 52 through the servo-cylinder 38.

A particular simple embodiment of an adjusting device provided with a slidable servo-cylinder and especially intended for smaller vessels is diagrammatically shown in FIG. 6. In this embodiment the servo-cylinder 138 is provided with a thick cylinder-wall 140 made integral with the one cylinder end cover 142 which is slidably mounted on a bushing 143 secured to the shaft 30 and carrying the servo-piston 137. The other cylinder end cover 144 is provided with an outwardly extending hub 158 and with an inwardly extending sleeve 159. By means of the hub 158 and the sleeve 159 the end cover 144 is slidably mounted on the shaft 30. The bushing 143 is provided with an inner recess 145 open towards the end cover 144 and receiving the sleeve 159. Through a hole 147 in the bushing 143 the recess 145 communicates with the atmosphere so that air within the recess 145 cannot hamper the reciprocation of the sleeve 159 in the recess 145.

The clutch pin 62 is secured to the hub 158 serving as clutch member.

The cylinder wall 140 serves in this embodiment as the valve spool 152 and is provided with two circumferential grooves 173 and 175 separated by a land 174. The groove 173 communicates through a passageway 176 in the cylinder wall 140 with the cylinder chamber 146 nearest the end cover 142, and the groove 175 communicates through a passageway 180 in the cylinder wall 140 with the other cylinder chamber 148.

A valve housing 154 having a cylindrical inner face 155 is slidably mounted on the cylinder wall 140 and is in its inner face 155 provided with three annular grooves 182, 184 and 186 separated by lands 183 and 185. The middle groove 184 communicates with an inlet pipe 188 on the housing 154 and the two side grooves 182 and 186 with an outlet branch pipe 194. The reciprocation of the valve housing 154 on the cylinder wall 140 is limited by two stop rings 156 and 166 secured to the end covers 142 and 144 respectively.

The valve housing 154 is prevented from rotation with the cylinder wall 140 by means of a side pin (not shown) corresponding to the side pin 68 in FIGS. 2 to 4, which pin engages a control lever (not shown) corresponding to the control lever 70 shown in FIG. 2.

The adjustment device shown in FIGURE 6, having only a relatively short axial extension, operates in the same way as described above in connection with the embodiment shown in FIGS. 2 to 4. When an adjustment is wanted the valve housing 154 is by means of the control lever displaced towards one or another of the two stop rings 156 and 166, whereby the servo-cylinder 138 is caused to be displaced in the same direction. By means of the control lever the valve housing is brought to follow the displacement of the servo-cylinder 154 engaging the stop ring is question, until the valve housing 154 has reached its position corresponding to the wanted new propeller blade position. Then the valve housing 154 is retained in said position so that the further displacement of the servo-cylinder on the shaft 30 causes a displacement of the valve spool 152 relative to the valve housing 154 until it has reached its neutral position relative to the valve housing, and the displacement of the servo-cylinder is thereby stopped.

A further embodiment of the invention is shown in FIG. 7. This embodiment comprises a servo-cylinder 238 with a cylinder wall 240 and two end covers 242 and 244 of which the end cover 242 is secured to the propeller shaft 30. Within the servo-cylinder 238 an annular piston 237 is arranged surrounding the shaft 30. The piston 237 is provided with a hub-shaped piston rod 251 slidably mounted on the propeller shaft 30 and extending through the cylinder end cover 244 which is slidable thereon. For controlling the flow of motive fluid to and from the two chambers serves a slide valve device 250 comprising a valve spool 252 constituting a portion of the piston rod 251 and a valve housing 254 surrounding the valve spool 252 and slidably mounted thereon. The free end portion of the piston rod 251 serves as a clutch member 258 provided with two diametrally opposite each other arranged radial holes 260 for the clutch pin 62. The latter is retained in the clutch member 258 by means of a stop ring 266 secured to the clutch member 258 covering the holes 260.

The inner face 253 of the valve spool 252 is provided with two circumferential grooves 273 and 275 separated by a land 274. The groove 273 communicates through and axial passageway 276 in the rod 251 with the cylinder chamber 248, and the groove 275 communicates through an axial passageway 280 in the rod 251 with the cylinder chamber 246.

The valve housing 254 is on its cylindrical inner face 255 provided with three annular grooves 282, 284 and 286 separated by lands 283 and 285. The middle groove 282 has a width somewhat greater than the width of the land 274 of the valve spool, in the same manner and with the same purpose as described above in connection with FIGS. 2 to 4. The middle groove 284 communicates with a pipe socket 288 the housing 254 which socket 288 by means of a flexible hose 290 communicates with a supply line 292 for motive fluid under pressure supplied by a pump 293 from a reservoir 298. The side grooves 282 and 286 communicates with a branch pipe 294 on the housing 254 which branch pipe 294 through a flexible hose 295 communicates with the reservoir 298.

The valve housing 254 is provided with a side pin engaging an oblong slot 269 in a control lever 270 pivoted to a stationary pivot pin 271 beneath the valve housing 254. This control lever 270 thus prevents the valve housing 254 from rotating with the valve spool 252 and may be used for displacing the valve housing 254 on the valve spool 252 between two extreme positions defined by the stop ring 266 and a stop ring 256 secured to the piston rod 251 at the side of the housing 254 facing the cylinder end cover 244.

In FIG. 7 the slide valve device 250 is shown in its neutral position in which the middle groove 284 of the valve housing 254 communicates with both the grooves 273 and 275 of the valve spool 252, and the side grooves 282 and 286 in the valve housing 254 communicate with the spool grooves 273 and 275 respectively, so that the motive fluid flows through the slide valve device 250 without influencing the servo-motor.

Now the valve housing 254 by means of the control lever 270 displaced on the valve spool 252 for example to the left in FIG. 7, so that it abuts the stop ring 256, the motive fluid will from the pipe 294 be directed through the grooves 284 and 273 and the passageways 276 into the cylinder-chamber 248 whereby the servo-piston 237 is displaced to the left in FIG. 7 carrying along the piston rod 251 including the valve spool 252 and the clutch member 258, so that even the adjusting rod 36 is displaced to the left in FIG. 7. This displacement continues as long as the valve housing 254 by means of the control lever 270 is brought to follow the displacement. When the valve housing is stopped the displacement of the piston 237 and the members connected thereto will continue only until the valve spool 252 has reached its neutral position relative to the valve housing 254.

The fluid located in the cylinder chamber 246 will then through the passageway 280 the grooves 275 and 286 and the branch pipe 294 flow back to the reservoir 298.

Since the maximum length of the piston stroke corresponds to the rotation of the propeller blades between the positions "full speed ahead" and "full speed astern," the blades may, as will be readily understood, when the piston or—in the embodiments shown in FIGS. 2 to 6 the servo-cylinder—is stopped in any arbitrary intermediate position be caused to assume any desired position between "full speed ahead" and "full speed astern," and the blades will remain in the position adjusted until the valve housing is again displaced on the valve spool by means of the control lever.

I claim:

1. In an adjusting device for adjusting the pitch of propeller blades; a rotatable propeller shaft having a hollow shaft portion at least at one end thereof; an adjusting rod slidably mounted within said hollow propeller shaft portion; a clutch member mounted axially displaceable on said propeller shaft for rotating therewith; connecting means firmly interconnecting said clutch member and said adjusting rod; a hydraulic servo-motor comprising a first and a second main motor member; one of said two main motor members being a servo-cylinder mounted on said shaft surrounding the same and arranged to rotate together with said shaft, the other being an annular servo-piston arranged within said servo-cylinder surrounding said shaft and arranged to rotate therewith; said first main motor member being secured to said shaft; said second main motor member being axially displaceable mounted on said shaft; a slide-valve device for controlling the inlet and outlet of motive fluid to and from said servo-motor, said slide-valve device comprising a tubular valve spool and a valve housing slidably mounted on said spool surrounding the same; said spool surrounding said shaft and being mounted axially displaceable relative to said shaft for rotating therewith; said second main motor member being firmly connected to said spool as well as to said clutch member; said valve housing being provided with an inlet port adapted to be connected to a supply line for motive fluid and with an outlet port for the motive fluid; means for preventing said housing from rotating with said spool; and a control member connected to said valve housing for axial displacement thereof relative to said spool.

2. In an adjusting device for adjusting the pitch of propeller blades; a rotatable propeller shaft having a hollow shaft portion at least at one end thereof; a propeller hub supported on said shaft and including adjustable blades; an adjusting rod slidably mounted within said hollow propeller shaft portion and operably connected to said blades; a clutch member slidably mounted on said shaft for rotating therewith connecting means firmly interconnecting said clutch member and said adjusting rod; a servo-cylinder surrounding said shaft and slidably mounted on said shaft for rotating therwith; an annular servo-piston arranged within said servo-cylinder surrounding said shaft and secured thereto; said servo-cylinder having a cylinder chamber at each side of said servo-piston; a slide-valve device adapted to control the communication between said two chambers and supply and discharge means for a motive fluid; said slide-valve device comprising a tubular valve spool slidably mounted on said shaft for rotating therewith and firmly connected to said servo-cylinder, and a valve housing slidably mounted on said spool surrounding the same; said valve housing being provided with an inlet port adapted to be connected to a supply line for motive fluid and an outlet port for the motive fluid; means for preventing said valve housing from rotating with said spool; and a control member connected to said valve housing for controlled axial displacement thereof relative to said spool; said clutch member being firmly connected to said spool and said servo-cylinder.

3. An adjusting device as defined in claim 2; said servo-cylinder having a cylinder wall and a first and a second end cover, said valve spool being firmly connected to said first end cover; said clutch member being firmly connected to said second end cover.

4. In an adjusting device for adjusting the pitch of propeller blades; a rotatable propeller shaft having a hollow shaft portion at least at one end thereof; and adjusting rod slidable mounted within said hollow propeller shaft portion; a clutch member slidably mounted on said shaft for rotating therewith; connecting means firmly interconnecting said clutch member and said adjusting rod; a servo-cylinder surrounding said shaft and slidably mounted on said shaft for rotating therewith; an annular servo-piston arranged within said servo-cylinder surrounding said shaft and secured thereto; said servo-cylinder having a cylinder chamber at each side of said servo-piston; a slide-valve device adapted to control the communication between said two cylinder chambers and supply and discharge means for a motive fluid; said servo-cylinder comprising a cylinder wall and a first and a second end cover; said cylinder wall constituting a valve spool of said slide-valve device; said slide-valve device further comprising a valve housing slidably mounted on said cylinder wall surrounding the same; said cylinder being rotatable relative to said valve housing; said valve housing being provided with an inlet port adapted to be connected to a supply line for the motive fluid and with an outlet port for the motive fluid; a control member connected to said valve housing for controlled axial displacement thereof relative to said cylinder wall; said clutch member being firmly connected to said first end cover.

5. An adjusting device as defined in claim 4; said clutch member being made integral with said first end cover.

6. An adjusting device as defined in claim 4; said first end cover being provided with a sleeve slidably mounted on said shaft and extending into said servo-cylinder; said servo-piston being secured to a bushing extending away from said first end cover and surrounding said shaft; said bushing being secured to said shaft; said bushing being provided with an annular inner recess open towards said first end cover; said sleeve extending into said recess.

7. An adjusting device as defined in claim 6, said second end cover being slidably mounted on said bushing.

8. In an adjusting device for adjusting the pitch of propeller blades; a rotatable propeller shaft having a hollow shaft portion at least at one end thereof; an adjusting rod displaceably mounted within said hollow propeller shaft portion; a clutch member slidably mounted on said shaft for rotating therewith; connecting means firmly interconnecting said clutch member and said adjusting rod; a servo-cylinder surrounding said shaft and being secured thereto; an annular servo-piston arranged within said servo-cylinder surrounding said shaft; said servo-piston being slidably mounted on said shaft; said servo-cylinder having a cylinder-chamber at each side of said servo-piston; a slide-valve device adapted to control the communication between said two cylinder chambers and supply and discharge means for a motive fluid; said slide-valve device comprising a tubular valve spool slidably mounted on said shaft for rotating therewith and firmly connected to said servo-piston, and a valve housing slidably mounted on said spool surrounding the same; said valve space being rotatable relative to said valve housing; said valve housing being provided with an inlet port adapted to be connected to a supply line for motive fluid and an outlet port for the motive fluid; a control member connected to said valve housing for controlled axial displacement thereof relative to said spool; said clutch member being firmly connected to said spool.

9. An adjusting device as defined in claim 8; said servo-piston being provided with a hub-shaped piston rod slidably mounted on said shaft, said piston rod having a first and a second hub portion; said first hub portion constituting said valve spool; said second hub portion constituting said clutch member.

10. In an adjusting device as defined in claim 2; said valve spool and said clutch member being made integral with each other to form a hub slidably mounted on said propeller shaft for rotating therewith and firmly connected to said servo-cylinder.

11. In an adjusting device for adjusting the pitch of propeller blades; a rotatable propeller shaft having a hollow shaft portion at least at one end thereof; an adjusting rod slidably mounted within said hollow shaft portion; a clutch member slidably mounted on said shaft for rotating therewith; connecting means firmly interconnecting said clutch member and said adjusting rod; a servo-cylinder surrounding said shaft and slidably mounted on said shaft for rotating therewith; an annular servo-piston arranged within said servo-cylinder surrounding said shaft and secured thereto; said servo-cylinder having a first and second cylinder chamber one at each side of said servo-piston; said servo-cylinder comprising a first and a second end cover and a cylinder wall; a slide-valve device adapted to control the communication between said two chambers and supply and discharge means for a motive fluid; said slide valve device comprising a tubular valve spool provided with a first and a second valve spool groove; and a valve housing slidably mounted on said spool surrounding the same; said valve spool being rotatable relative to said valve housing; said valve spool constituting a portion of a hub slidably mounted on said propeller shaft for rotating therewith; said hub being firmly connected to said first end cover; said valve housing being provided with an inlet port adapted to be connected to a supply line for motive fluid and an outlet port for the motive fluid; a control member connected to said valve housing for controlled axial displacement thereof relative to said spool; said clutch member being firmly connected to said spool and said servo-cylinder; said first spool groove communicating with said first cylinder chamber through at least a first axial bore in said hub communicating with a transverse bore in said first end cover; said second spool groove communicating with said second cylinder chamber through at least a second axial bore in said hub communicating with a radial bore in said first end cover communicating with an axially extending bore in said cylinder wall.

12. In an adjusting device for adjusting the pitch of propeller blades; a propeller shaft having a hollow shaft portion at least at one end thereof; an adjusting rod slidably mounted within said hollow shaft portion; a clutch member slidably mounted on said shaft for rotating therewith; connecting means firmly interconnecting said clutch member and said adjusting rod; a servo-cylinder surrounding said shaft and being secured thereto; an annular servo-piston arranged within said servo-cylinder slidably mounted on said shaft surrounding the same; said servo-cylinder having a first and a second cylinder chamber, one on each side of said servo-piston; said servo-cylinder comprising a first and a second end cover and a cylinder wall; a slide valve device adapted to control the communication between said two cylinder chambers and supply and discharge means for a motive fluid; said slide valve device comprising a tubular valve spool and a valve housing slidably mounted on said spool surrounding the same; said spool being rotatable relative to said valve housing; said valve housing being provided with an inlet port adapted to be connected to a supply line for motive fluid and an outlet port for the motive fluid; said valve spool constituting a portion of a hub slidably mounted on said shaft for rotating therewith and firmly connected to said servo-piston; said spool being provided with a first and a second spool groove, said first spool groove communicating with said first cylinder chamber through at least one first axial bore in said hub communicating with said first cylinder chamber; said second spool groove communicating with said second cylinder chamber through at least one second axial bore in said hub communicating with a transverse bore in said piston; a control member connected to said valve housing for controlled axial displacement thereof relative to said spool; said clutch member being firmly connected to said spool.

(References on following page)

References Cited by the Examiner

UNITED STATES PATENTS

| | | | |
|---|---|---|---|
| 88,431 | 3/1869 | Atkins | 121—41 |
| 1,954,379 | 4/1934 | Eller | 121—41 |
| 2,279,633 | 4/1942 | Merickle | 170—160.43 X |
| 2,377,386 | 6/1945 | Stalker | 170—160.32 X |
| 2,442,691 | 6/1948 | Holberton | 170—160.32 |
| 2,480,521 | 8/1949 | Thompson | 170—160.43 X |
| 3,057,410 | 10/1962 | Biermann | 170—160.32 |

FOREIGN PATENTS

| | | |
|---|---|---|
| 27,972 | 6/1921 | Denmark. |
| 1,260,746 | 4/1961 | France. |
| 1,097,309 | 1/1961 | Germany. |
| 565,579 | 11/1944 | Great Britain. |
| 233,498 | 11/1944 | Switzerland. |

SAMUEL LEVINE, *Primary Examiner.*

ABRAM BLUM, JULIUS E. WEST, *Examiners.*

E. A. POWELL, *Assistant Examiner.*